United States Patent [19]

Hubbard et al.

[11] Patent Number: 5,234,987
[45] Date of Patent: Aug. 10, 1993

[54] SOLVENT-BASED ADHESIVE COMPOSITION FOR ROOFING MEMBRANES

[75] Inventors: Michael J. Hubbard; Brian J. Briddell; Dennis K. Fisher, all of Jackson, Mich.

[73] Assignee: Adco Products, Inc., Michigan Center, Mich.

[21] Appl. No.: 908,408

[22] Filed: Jul. 6, 1992

[51] Int. Cl.$^5$ .................. C08K 5/36; C08F 297/04
[52] U.S. Cl. .................................. 524/505; 524/271; 524/273
[58] Field of Search .................. 524/271, 273, 505

[56] References Cited

U.S. PATENT DOCUMENTS

| | | | |
|---|---|---|---|
| 2,163,609 | 6/1939 | MacDonald | 524/273 |
| 2,767,152 | 10/1956 | Bierman et al. | 524/271 |
| 2,884,400 | 4/1959 | Moore | 524/271 |
| 2,947,710 | 8/1960 | Frantz | 524/271 |
| 4,588,637 | 5/1986 | Chiu | 525/331.9 |
| 4,603,164 | 7/1986 | Chmiel et al. | 524/507 |
| 4,640,730 | 2/1987 | Streets et al. | 524/504 |
| 4,742,119 | 5/1988 | Close | 524/526 |
| 4,855,172 | 8/1989 | Chiu | 428/157 |
| 4,881,996 | 11/1989 | Nussbaum et al. | 524/505 |
| 5,095,068 | 3/1992 | Chiu | 524/525 |

FOREIGN PATENT DOCUMENTS 0330089  8/1989  European Pat. Off. ............ 524/271

OTHER PUBLICATIONS

Brochure–Kraton® Thermoplastic Rubber, Shell Chemical Company. Typical Properties 1986.
Brochure/Technical Information–Exxon® Bromo XP-50, New Isobutylene-based elastomers for outstanding ozone, UV and heat resistance, Exxon Chemical, Sep. 1991.

Primary Examiner—Paul R. Michl
Assistant Examiner—Olga Asinovsky
Attorney, Agent, or Firm—Killworth, Gottman, Hagan & Schaeff

[57] ABSTRACT

A solvent-based adhesive composition for adhering together roofing materials, such as synthetic EPDM rubber sheets, which provides long term storage stability is provided. The adhesive composition includes a halogenated copolymer of isobutylene and p-methyl styrene, a thermoplastic rubber comprising a styrene-ethylene-butylene-styrene block copolymer, an end-block resin for the thermoplastic rubber, a tackifier, an accelerator/cure package, and a solvent. The cured composition exhibits a peel strength of at least 3.0 pounds per lineal inch at room temperature, at least 3.0 pounds per lineal inch at 212° F., supports a static load of at least 0.67 pounds at 158° F. for a minimum of 24 hours, and exhibits a viscosity increase of less than 1500 centipoise after aging at 130° F. for six weeks.

24 Claims, No Drawings

SOLVENT-BASED ADHESIVE COMPOSITION FOR ROOFING MEMBRANES

BACKGROUND OF THE INVENTION

The present invention relates to a solvent-based adhesive composition for permanent bonding of synthetic rubber sheeting, and more particularly, to a solvent-based adhesive composition which exhibits excellent adhesion, peel strength, static load strength, and storage stability, and is curable on a job site.

Roofing materials for covering large roof areas are customarily prepared in wide sheets for installation. Elastomeric ethylene-propylene-nonconjugated diene terpolymer (EPDM) and isobutylene-conjugated diene copolymer (butyl rubber) compositions are well known in the art as roofing materials due to their barrier properties against moisture. These sheets must be overlapped and spliced together to form a continuous, water-tight sheet which covers a roof.

A common method of sealing the overlapping sheets together has been the use of adhesives such as solvent-based neoprene adhesives. Problems have been encountered with the bond strength of neoprene adhesives, and with the long term durability of those bonds due to moisture sensitivity.

The other commonly used solvent type adhesive is butyl rubber-based adhesives containing isocyanates as a portion of the curative components. However, these adhesives have limited shelf life and high toxicity.

Many efforts have been made to improve upon such solvent-based adhesives. For example, Nussbaum et al, U.S. Pat. No. 4,881,996, relate to a solvent-based adhesive composition comprising a halogenated pre-crosslinked butyl rubber, a thermoplastic copolymer, a hydrocarbon resin, a quinoid cure component mixture, and a solvent. However, while this composition avoids the necessity of a primer, it is believed to have a limited shelf life due to the very active curative components and a relatively low static load strength.

Chmiel et al, U.S. Pat. No. 4,603,164, disclose an adhesive composition comprising a blend of a halogenated butyl rubber, a pre-crosslinked butyl rubber, a methylene-propylene-nonconjugated diene terpolymer, a petroleum hydrocarbon based aliphatic thermoplastic resin, and an aliphatic isocyanate. However, while this composition exhibits good adhesion characteristics, it is believed to have limited storage stability as exposure to moisture leads to gelation of the composition. Further, extra care must be taken when handling the composition due to the toxicity of the isocyanate component.

Close, U.S. Pat. No. 4,742,119, also teaches a solvent-based roofing adhesive composition which is cured in situ after application to a roofing membrane. Such prior art in situ cure adhesives, however, have typically exhibited low initial peel strengths. In addition, use of such solvent-based adhesives may allow sliding of the seam in the shear direction to occur before there is enough time for the adhesive to cure and gain sufficient strength to hold the rubber sheets, and thus the seam, intact.

Additionally, other attempts have been made in the art to develop adhesive tapes which may be applied more readily and which provide a long term capability to withstand moisture penetration. For example, Chiu U.S. Pat. Nos. 4,588,637, 4,855,172, and 5,095,068, teaches a roofing adhesive tape of a cured butyl rubber-based composition made by compounding a butyl rubber copolymer, a curing agent for the butyl rubber, carbon black, and a compatible tackifier. However, such adhesive tapes require additional fabrication steps to pre-cure the composition and then form it into a tape prior to its application.

Accordingly, the need exists in the art for a solvent-based adhesive composition for adhering together sheets of EPDM-based roofing materials which provides ease of application and curing on the job site. There is also a need in the art for such a solvent-based adhesive which provides improved levels of adhesion, peel strength, and static load strength, as well as possessing storage stability.

SUMMARY OF THE INVENTION

The present invention meets the aforementioned needs by providing a solvent-based adhesive composition for adhering together roofing materials, such as EPDM rubber sheets, which may be applied and cured on a job site. The adhesive composition of the present invention provides high levels of adhesion, peel strength, and static load strength, and has excellent storage stability. By storage stable, it is meant that the composition resists moisture and gelation even after substantial aging prior to use.

According to one aspect of the present invention, a solvent-based adhesive composition for adhering together roofing materials such as EPDM rubber membranes is provided comprising a halogenated copolymer of isobutylene and p-methyl styrene, a thermoplastic rubber, an endblock resin for the thermoplastic rubber, a tackifier, an accelerator/cure package, and a solvent. Whereupon curing, the adhesive composition preferably exhibits a peel strength of at least 3.0 pounds per lineal inch (pli) at room temperature, at least 3.0 pounds per lineal inch at 212° F., and supports a static load of at least 0.67 pounds at 158° F. for a minimum of 24 hours. The storage stability of the composition is exhibited by a viscosity increase of less than 1,500 centipoise after the adhesive is aged at 130° F. for six weeks in a sealed container.

Preferably, the thermoplastic rubber comprises a styrene-ethylene-butylene-styrene block copolymer, which enhances the initial static load strength of the composition. An endblock resin, preferably a hydrocarbon resin, is added to enhance static load strength by interaction with the thermoplastic rubber. For example, cumarone indene is a suitable endblock resin for a hydrocarbon resin in the present composition. The accelerator/cure package of the present invention preferably comprises a mixture of sulfur, benzothiazyl disulfide, magnesium oxide and zinc oxide. Preferably, the solvent is selected from the group consisting of toluene, xylene, hexane, octane, and mixtures thereof. The adhesive composition may further include a reinforcing agent, an antioxidant, an antisettling agent and a retarding agent for purposes of increasing the strength and stability of the composition.

In a preferred form, the adhesive composition of the present invention comprises: a) from about 5% to about 30% by weight of a halogenated copolymer of isobutylene and p-methyl styrene; b) from about 3% to about 20% by weight of a thermoplastic rubber; c) from about 0.1% to about 15% by weight of an endblock resin for the thermoplastic rubber; d) from about 0.1% to about 15% by weight of a tackifier; e) from about 0.01% to about 5% by weight of an accelerator/cure package;

and f) from about 60% to about 80% by weight of a solvent, whereupon curing the composition exhibits a peel strength of at least 3.0 pli at room temperature, at least 3.0 pli at 212° F., supports a static load of at least 0.67 pounds at 158° F., and exhibits a viscosity increase of less than 1500 centipoise after aging at 130° F. for six weeks.

The present invention also provides a method of making a solvent-based adhesive composition for adhering together EPDM roofing materials which includes the steps of: (a) forming a homogenous mixture of a halogenated copolymer of isobutylene and p-methyl styrene, a thermoplastic rubber, and an accelerator/cure package; (b) pelletizing the mixture; (c) adding an endblock resin for the thermoplastic rubber, a tackifier, and a solvent to the mixture so as to form a slurry; and (d) mixing the slurry until the mixture, the resin and the tackifier are completely solvated in the solvent. With the method of the present invention, an adhesive composition having the characteristics described herein is obtained.

Accordingly, it is an object of the present invention to provide an adhesive composition which has a long storage life and can be easily applied and cured on the job site; it is a further object of the present invention to provide a solvent-based adhesive composition for use in adhering together sheets of roofing materials which provides high levels of adhesion, peel strength, and static load strength. These and other objects and advantages of the invention will become apparent from the following detailed description and the appended claims.

DETAILED DESCRIPTION OF THE PREFERRED EMBODIMENT

The solvent-based adhesive composition of the present invention provides the advantage of easy application at a job site without the need for pre-curing as required in many of the prior art adhesive tape compositions. Moreover, the solvent-based adhesive composition possesses improved characteristics over prior art solvent-based adhesives in that it provides higher levels of adhesion, peel strength, and static load strength, as well as possessing excellent storage stability.

The present adhesive composition comprises a halogenated copolymer of isobutylene and p-methyl styrene which combines the low permeability properties of a butyl rubber with the environmental and aging properties of an EPDM rubber. Thus, use of the copolymer in the adhesive composition results in an adhesive which exhibits better storage stability than prior art butyl rubber-based adhesives. This halogenated copolymer also provides better adhesion than prior art butyl rubber-based adhesives, and thus requires less modification of the composition to achieve acceptable levels of adhesion, viscosity, and strength. This is due to the very reactive nature of the halogenated copolymer which allows the composition to employ a less active accelerator/cure package or system, thus increasing the storage stability of the adhesive while maintaining high peel strength and static load strength. Another advantage of the halogenated copolymer is that like EPDM rubber, the halogenated copolymer has a fully saturated backbone, and consequently, is more heat resistant and UV resistant, thereby having the capability of withstanding long term roof top conditions significantly better than prior art butyl rubber based adhesives which continue to crosslink after installation and eventually may lose their adhesiveness.

Additionally, since the copolymer is preferably halogenated, most preferably brominated, it is more reactive than conventional butyl based rubber due to location of the substituted bromine in the para position on methylstyrene. Such a halogenated copolymer is commercially available from Exxon Chemical Company under the product name Bromo XP-50. Several grades of the product Bromo XP-50 are commercially available and suitable for use including EMDX 89-1, EMDX 89-4, EMDX 90-2, EMDX 90-3, and EMDX 90-10. While all of the various grades of the copolymer are suitable for use in the present adhesive composition, they vary with respect to molecular weight, styrene content and bromine level.

For purposes of enhancing the initial static load strength of the present adhesive composition, a thermoplastic rubber is preferably included. More preferably, the thermoplastic rubber comprises a copolymer of styrene-ethylene/butylene-styrene which is commercially available from a variety of sources. Preferably, the copolymer of styrene-ethylene/butylene-styrene is purchased from Shell Chemical Company under the product name Kraton G-1650. In addition, a blend of endblock and midblock (hereinafter the midblock is referred to as a tackifier) hydrocarbon resins may be added to the adhesive composition containing the thermoplastic rubber to enhance static load resistance by interaction with the thermoplastic rubber. To that end, a preferred endblock resin for use in the present adhesive composition is cumarone indene, which has a softening point of about 311° F., and is commercially available from Neville Chemical under the product name Cumar LX-509. It should be understood that other endblock and tackifier resins which are compatible with the chosen thermoplastic rubber may be used without departing from the scope of the invention.

The tackifier (midblock) in the adhesive composition preferably comprises an aliphatic hydrocarbon resin. Most preferably, the aliphatic hydrocarbon resin is a $C_5$ or $C_9$ hydrocarbon having a softening point of about 356° F. As those skilled in the art will appreciate, the tackifier is used to provide the adhesive composition with its high initial adhesivity and softness. A suitable tackifier or tackifying agent is commercially available from Hercules Chemical under the product name Piccovar AB-180. Other suitable tackifiers include polybutene, for example Indopol H-100, H-300, H-1500, or H-1900 which are commercially available from Amoco Chemical; Parapol 700, 950, 1300, 2200, or 2500 which are commercially available from Exxon Chemical; phenolic resins Akron P-90 and P-133 which are commercially available from Akrochem; SP-1068 and SP-1077 which are commercially available from Schenectady Chemical; Durez 31671 which is commercially available from Occidental Chemical; Dyphene 8318 or 8320 which are commercially available from Sherwin-Williams Company; and mixtures thereof.

The adhesive composition also includes an accelerator/cure package or system. The present adhesive composition may be cured using several well-known curing systems including sulfur and sulfur-containing systems as well as zinc oxide. Preferably, the accelerator/cure package comprises a mixture of sulfur, benzothiazyl disulfide (MBTS), magnesium oxide and zinc oxide. The addition of a small amount of zinc oxide improves the high temperature stability of the adhesive composition. Other suitable accelerators for use in the present accelerator/curing package include sulfur, thiazoles, dithiocarbamates, and stearic acid. By way of example only, the following materials may be used in the accelerator/cure package: 4,4′dithiodimorpholine; 2-(morpholino-dithio)-benzothiazole; zinc dibutyl phosphorodithiate; 2-mercapto-benzo-thiazole; zinc mercaptobenzo-thiazole; zinc dibutyl dithiocarbamate; zinc diethyl dithiocarbamate; zinc dimethyl dithiocarbamate; copper dibenzyl dithiocarbamate; zinc dimethyl dithiocarbamate; copper dibenzyl dithiocarbamate; tellurium diethyl dithiocarbamate; and mixtures thereof, all of which are commercially available from Akrochem, R. T. Vanderbilt, Akzo, E. I. du Pont de Nemours and Company, Mobay, Monsanto Chemical Company, Pennwalt, or Uniroyal Chemical.

Furthermore, the accelerator/cure package preferably includes a small amount of a retarding agent such as magnesium oxide which helps promote the storage stability of the composition. In particular, the retarding agent forms a complex with the halogen of the isobutylene-paramethyl styrene copolymer so as to decrease or buffer the reactivity of the copolymer, thereby increasing the storage stability of the adhesive composition. As those skilled in the art will appreciate, known retarding agents other than those described herein may also be used in the present adhesive composition.

Preferably, the adhesive composition further includes a reinforcing agent, an antioxidant, an antisettling agent and an accelerator agent, all of which are included for purposes of increasing the strength and stability of said composition. The reinforcing agent serves to add strength to the adhesive composition and preferably comprises carbon black in a small amount. It should be understood that the carbon black may also act as a coloring agent in the adhesive composition. The antioxidant is included to stabilize the thermoplastic rubber and the copolymer. While there are many suitable antioxidants, it is preferable to use a phenolic material which is commercially available from The Goodyear Tire & Rubber Company under the product name Wingstay L. The antisettling agent is included to prevent settling of the adhesive composition prior to use. Preferably, the antisettling agent comprises a fine particle filler material such as fumed silica which is commercially available from DeGussa Company under the product name Aerosil R-972. The addition of a retarding agent aids in the prevention of premature curing of the adhesive composition prior to use while also accelerating the curing when the adhesive composition is exposed to higher temperature—i.e. higher than room temperature. For such purposes, it is preferable to use stearic acid as the accelerator agent. In addition, other conventional fillers or desiccants such as calcium oxide (lime) may be incorporated into the present adhesive composition to serve as moisture absorbers and stabilizers.

The preferred solvents for the adhesive composition are aliphatic and/or aromatic hydrocarbons such as toluene, xylene, hexane, octane, and mixtures thereof. The most preferred solvent, however, is toluene. It should be understood that blends of other aliphatic or aromatic solvents are also suitable for use as the solvent in the present adhesive composition. Additionally, oxygenated solvents, such as ethyl acetate, acetone and other ketone and ester based solvents, may be used up to about 25% of the total solvent amount so as to minimize swelling which may occur due to lack of compatibility of the adhesive with EPDM sheets. Such swelling is minimized by using the aforementioned oxygenated solvents since they do not attack EPDM sheets. To the nominal extent that such swelling is experienced with the present adhesive composition, the swelling attribute is eliminated by the inclusion of such oxygenated solvents.

Based on the foregoing, the preferred solvent-based adhesive composition comprises: a) from about 5% to about 30% by weight of the halogenated copolymer of isobutylene and p-methyl styrene; b) from about 3% to about 20% by weight of the thermoplastic rubber; c) from about 0.1% to about 15% by weight of the endblock resin for said thermoplastic rubber; d) from about 0.1% to about 15% by weight of the tackifier; e) from about 0.01% to about 5% by weight of the accelerator/cure package; and f) from about 60% to about 80% by weight of the solvent. More preferably, the adhesive composition comprises: a) from about 10% to about 14% by weight of said copolymer of isobutylene and p-methyl styrene; b) from about 5% to about 9% by weight of said thermoplastic rubber; c) from about 1% to about 3% by weight of said endblock resin for said thermoplastic rubber; d) from about 4% to about 8% by weight of said tackifier; e) from about 0.05% to about 2% by weight of said accelerator/cure package; and f) from about 65% to about 75% by weight of said solvent. In addition, the adhesive composition preferably includes carbon black in an amount from about 0.01% to about 2% by weight, a phenolic material in an amount from about 0.01% to about 2% by weight, fumed silica in an amount from about 0.2% to about 5% by weight, and stearic acid in an amount from about 0.01% to about 2% by weight.

Preferably, whereupon curing the adhesive composition exhibits a peel strength of at least 3.0 pounds per lineal inch (pli) at room temperature and at least 3.0 pounds per lineal inch (pli) at 212° F. Further, the adhesive composition preferably supports a static load of at least 0.67 pounds at 158° F. for a minimum of 24 hours. Finally, the adhesive composition preferably possesses high storage stability by experiencing a viscosity increase of less than 1,500 centipoise after the adhesive composition has been aged at 130° F. for six weeks in a sealed container. Such features of the invention result in an adhesive composition which can be effectively used at the job site without prior curing steps and the like.

The present invention also provides a method by which the present solvent-based adhesive composition is made. In that regard, the present method preferably comprises the steps of: (a) forming a homogenous mixture of a copolymer of isobutylene and p-methyl styrene, a thermoplastic rubber, and an accelerator/cure package; (b) pelletizing the mixture; (c) adding an endblock resin for the thermoplastic rubber, a tackifier, and a solvent to the mixture so as to form a slurry; and (d) mixing the slurry until the mixture, the resin and the tackifier are completely solvated in the solvent. It should be understood that the components used in the present method are the same as described in detail previously. In that regard, the preferable forming step comprises the step of mixing: a) from about 10% to about 14% by weight of the halogenated copolymer of isobutylene and p-methyl styrene; b) from about 5% to about 9% by weight of the thermoplastic rubber; and c) from about 0.05% to about 2% by weight of the accelerator/cure package; and wherein the adding step preferably comprises the step of adding d) from about 1% to about 3% by weight of the endblock resin for the thermoplastic rubber; e) from about 4% to about 8% by weight of the tackifier; and f) from about 65% to about 75% by weight of the solvent.

Preferably, the method of the invention further includes the step of loading the slurry with the aforementioned reinforcing agent, the antioxidant, the antisettling agent and the accelerator agent for purposes of increasing the strength and stability of the adhesive composition. It is also preferable to form the mixture by loading the copolymer, the thermoplastic rubber and the accelerator/cure package into a mixer, for example a sigma blade mixer, and mixing the components into a smooth or consistent mixture. As those skilled in the art will appreciate, while forming the mixture in this manner, care should be taken to ensure that the mixture is not scorched. Typically, this can be accomplished by maintaining the mixer at a relatively low temperature. As a result, the mixing step preferably comprises mixing the slurry in a mixer maintained at temperature below about 200° F. so as to minimize scorching said slurry. With respect to the step of mixing the mixture, the resin and the solvent, it is preferable to use a low speed mixer, for example a churn mixer, for solvation. By use of the above-described techniques in the present method, the preferred adhesive composition as described above is formed.

While using the adhesive composition of the invention, it is preferable to stir the adhesive composition thoroughly and apply it to a clean, dry EPDM membrane. In this way, the high levels of adhesion, peel strength, and static load strength exhibited by the present adhesive composition are maximized. As is known, an effective way in which the EPDM membrane is cleaned in field applications contemplates washing the membrane with unleaded gasoline or other solvents such as heptane prior to applying the adhesive composition. Preferably, the adhesive is applied with a soft bristle paint brush with a minimum amount of strokes for total coverage of the splice area. The adhesive is then allowed to dry until the film cannot be pushed or slid on the EPDM membrane surface with finger pressure. After drying, the top EPDM membrane is bonded to the bottom EPDM membrane with the use of a hand roller. The outer edge of the splice is then sealed with lap sealant.

In order that the invention may be more readily understood, reference is made to the following examples of compositions within the scope of the present invention, which examples are intended to be illustrative of the invention, but are not intended to be limiting in scope.

EXAMPLE 1

Several solvent-based adhesive compositions were prepared in accordance with the present invention. More particularly, the relative proportions of each component in adhesive compositions designated as A, B, C, D, E and F are listed in Table I below. Additionally, compositions G, H, and I were prepared in accordance with the prior art butyl rubber-based adhesives and their relative proportions are set forth in Table I, as well. For each of compositions A, B, C, D, E and F, the copolymer of isobutylene and p-methyl styrene and styrene-ethylene/butadiene-styrene block copolymer were loaded with the antioxidant, carbon black, calcium oxide and accelerator/cure package into a sigma blade mixer and mixed until smooth and homogenous. While mixing in the sigma blade mixer, the resulting mixture was kept cool (below 200° F.) to avoid scorch. Thereafter, the mixture was pelletized. The pelletized mixture, resins, and solvent were then loaded into a low RPM churn mixer and mixed until the batch was totally solvated in the solvent. Insofar as the prior art compositions G, H and I, the same procedure was followed with the exception of substituting butyl rubber for the halogenated copolymer.

TABLE I

| Compound Description | A | B | C | D | E | F | G | H | I |
|---|---|---|---|---|---|---|---|---|---|
| | (% by weight) | | | | | | | | |
| copolymer of isobutylene and p-methyl styrene[1] | 11.90 | 0.00 | 11.90 | 0.00 | 0.00 | 0.00 | 0.00 | 0.00 | 0.00 |
| copolymer of isobutylene and p-methyl styrene[2] | 0.00 | 11.90 | 0.00 | 0.00 | 0.00 | 0.00 | 0.00 | 0.00 | 0.00 |
| copolymer of isobutylene and p-methyl styrene[3] | 0.00 | 0.00 | 0.00 | 0.00 | 0.00 | 11.90 | 0.00 | 0.00 | 0.00 |
| copolymer of isobutylene and p-methyl styrene[4] | 0.00 | 0.00 | 0.00 | 0.00 | 11.90 | 0.00 | 0.00 | 0.00 | 0.00 |
| copolymer of isobutylene and p-methyl styrene[5] | 0.00 | 0.00 | 0.00 | 11.90 | 0.00 | 0.00 | 0.00 | 0.00 | 0.00 |
| copolymer of styrene-ethylene/butylene-styrene[6] | 6.50 | 6.50 | 6.50 | 6.50 | 6.50 | 6.50 | 6.50 | 6.50 | 6.50 |
| Butyl rubber[7] | 0.00 | 0.00 | 0.00 | 0.00 | 0.00 | 0.00 | 11.90 | 0.00 | 0.00 |
| Butyl rubber[8] | 0.00 | 0.00 | 0.00 | 0.00 | 0.00 | 0.00 | 0.00 | 11.90 | 0.00 |
| Butyl rubber[9] | 0.00 | 0.00 | 0.00 | 0.00 | 0.00 | 0.00 | 0.00 | 0.00 | 11.90 |
| Accelerator/cure package | 0.30 | 0.30 | 0.30 | 0.30 | 0.30 | 0.30 | 0.30 | 0.30 | 0.30 |
| Antioxidant | 0.12 | 0.12 | 0.12 | 0.12 | 0.12 | 0.12 | 0.12 | 0.12 | 0.12 |
| Magnesium oxide | 0.12 | 0.12 | 0.12 | 0.12 | 0.12 | 0.12 | 0.12 | 0.12 | 0.12 |
| Zinc oxide | 0.62 | 0.62 | 0.62 | 0.62 | 0.62 | 0.62 | 0.62 | 0.62 | 0.62 |
| Carbon Black | 0.10 | 0.10 | 0.10 | 0.10 | 0.10 | 0.10 | 0.10 | 0.10 | 0.10 |
| Quicklime | 0.39 | 0.39 | 0.39 | 0.39 | 0.39 | 0.39 | 0.39 | 0.39 | 0.39 |
| Cumarone indene | 3.00 | 3.00 | 3.00 | 3.00 | 3.00 | 3.00 | 3.00 | 3.00 | 3.00 |
| Tackifier | 6.00 | 6.00 | 6.00 | 6.00 | 6.00 | 6.00 | 6.00 | 6.00 | 6.00 |

TABLE I-continued

| Compound Description | A | B | C | D | E | F | G | H | I |
|---|---|---|---|---|---|---|---|---|---|
| | | | | (% by weight) | | | | | |
| Toluene | 71.00 | 71.00 | 71.00 | 71.00 | 71.00 | 71.00 | 71.00 | 71.00 | 71.00 |

[1] Bromo XP-50 EMDX 89-4 from Exxon Chemical Company
[2] Bromo XP-50 EMDX 90-2 from Exxon Chemical Company
[3] Bromo XP-50 EMDX 90-10 from Exxon Chemical Company
[4] Bromo XP-50 EMDX 90-3 from Exxon Chemical Company
[5] Bromo XP-50 EMDX 89-1 from Exxon Chemical Company
[6] Kraton G-1650 from Shell Chemical Company
[7] Exxon 268 from Exxon Chemical Company
[8] HT-1068 from Exxon Chemical Company
[9] Bromo X-2 from Polysar Rubber, a Division of Miles, Inc.

EXAMPLE 2

All of the adhesive compositions prepared in Example 1 were tested to determine levels of peel strength, static load strength, and viscosity. Each of the compositions was individually applied to two 6 in. × 10 in. pieces of EPDM rubber sheet and dried for 30 minutes. The two pieces were then mated together and rolled with a 15 lb. roller, once in each direction. All of the resulting samples were cut into 1 in. × 6 in. strips for testing. Accordingly, each of the resulting strips was aged as set forth in Table II and then pulled in a tensile tester at a rate of two inches per minute. The viscosity of each composition was measured by using a conventional viscometer having a spindle rotating at 10 rpm. The detailed results are reported in Table II below.

TABLE III

| Storage stability of Formula A | |
|---|---|
| Initial Viscosity | 3500 cps |
| 1 week aging at 130° F. | 3900 cps |
| 2 weeks aging at 130° F. | 4300 cps |
| 3 weeks aging at 130° F. | 4300 cps |
| 4 weeks aging at 130° F. | 4100 cps |
| 5 weeks aging at 130° F. | 4050 cps |
| 6 weeks aging at 130° F. | 4275 cps |

As seen in Table III, composition A experienced a viscosity increase of substantially less than 1500 cps, even after aging at 130° F. for six weeks in a sealed container. These results exhibit the desired lengthy shelf-life of composition A which was made in accordance with the invention.

TABLE II

| Physical Compound Description | A | B | C | D | E | F | G | H | I |
|---|---|---|---|---|---|---|---|---|---|
| % Solids | 29.7 | 29.0 | 29.9 | 29.0 | 29.1 | 29.2 | 28.0 | 26.9 | 27.6 |
| Viscosity, cps, room temperature | 3500 | 2300 | * | 2850 | 4000 | 3550 | 2750 | 2300 | 2400 |
| Peel strength, pli, 24 hrs. at room temperature | 4.6 | 5.2 | 4.1 | 4.3 | 3.9 | 4.1 | 4.4 | 3.8 | 3.9 |
| Peel strength, pli, 24 hrs. at 212° F. | 5.2 | 6.0 | 6.7 | 6.1 | 4.0 | 3.8 | 2.0 | 3.2 | 1.0 |
| Peel strength, pli, 7 days at room temperature | 7.2 | 8.6 | 7.8 | 7.6 | 6.8 | 6.1 | 4.8 | 5.4 | 3.6 |
| Peel strength, pli, 7 days at 158° F., peeled at 158° F. | 4.2 | 3.4 | 5.8 | 3.3 | 3.3 | 3.5 | 0.7 | 0.4 | 1.9 |
| Peel strength, pli, 7 days at 212° F. | 8.9 | 5.4 | 8.5 | 6.7 | 6.8 | 7.1 | 4.6 | 5.0 | 5.5 |

*Too high to measure

As seen in Table II, compositions A, B, C, D, E and F made in accordance with the invention generally exhibited higher levels of peel strength at the various conditions as compared to compositions G, H and I which were made in accordance with the prior art butyl rubber based compositions.

EXAMPLE 3

As made in Example 1, composition A was tested in a conventional viscometer having a spindle rotating at 10 rpm at the various conditions set forth in Table III below. The aging was accomplished by storing composition A in a sealed container as would occur when the solvent-based adhesive is sold commercially.

EXAMPLE 4

Several tests were conducted for static load resistance for compositions A, B, C, D, E and F prepared in Example 1 in accordance with the invention. Each test used four 1"×2" sections of 0.045" EPDM. One side of each strip was cleaned with hexane by wetting a section of a towel and thoroughly scrubbing each strip. Two strips were placed side by side, and then allowed to air dry for 30 minutes.

The composition to be tested was stirred thoroughly. A thin coat of the composition was then applied to each strip over at least one inch of the strips from one end and allowed to dry for 30 minutes. The portions of the strips containing the adhesive were then overlapped so that a 1" length of EPDM overhung the test samples on each end. Each assembly was then passed over five times with a 15 pound roller. After 30 minutes at room temperature, a 0.67 pound weight was hung from the strip on a 158° F. oven for 24 hours. All of the compositions, namely A, B, C, D, E and F, of the present invention supported the load for 24 hours without slippage or failure.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A solvent-based adhesive composition for adhering together roofing materials comprising:
   a halogenated copolymer of isobutylene and p-methyl styrene,
   a thermoplastic rubber,
   an endblock resin for said thermoplastic rubber,
   a tackifier,
   an accelerator/cure package including a sulfur and/or zinc oxide curing agent; and
   a solvent, whereupon curing said composition exhibits a peel strength of at least 3.0 pounds per lineal inch at room temperature, at least 3.0 pounds per lineal inch at 212° F., supports a static load of at least 0.67 pounds at 158° F., and exhibits a viscosity increase of less than 1500 centipoise after aging at 130° F. for six weeks.

2. The composition of claim 1 wherein said thermoplastic rubber comprises a styrene-ethylene/butylene-styrene block copolymer.

3. The composition of claim 2 wherein said endblock resin comprises cumarone indene.

4. The composition of claim 1 further including a reinforcing agent, an antioxidant, an antisettling agent and an accelerator agent for purposes of increasing the strength and stability of said composition.

5. The composition of claim 1 wherein said tackifier comprises an aliphatic hydrocarbon resin.

6. The composition of claim 1 wherein said solvent is selected from the group consisting of toluene, xylene, hexane, octane, and mixtures thereof.

7. The composition of claim 1 wherein said accelerator/cure package comprises a mixture of sulfur, benzothiazyl disulfide, magnesium oxide, and zinc oxide.

8. A solvent-based adhesive composition for adhering together roofing materials comprising:
   a) from about 5% to about 30% by weight of a halogenated copolymer of isobutylene and p-methyl styrene;
   b) from about 3% to about 20% by weight of a thermoplastic rubber;
   c) from about 0.1% to about 15% by weight of an endblock resin for said thermoplastic rubber;
   d) from about 0.1% to about 15% by weight of a tackifier;
   e) from about 0.01 to about 5% of an accelerator/cure package including a sulfur and/or zinc oxide curing agent; and
   f) from about 60% to about 80% by weight of a solvent, whereupon curing said composition exhibits a peel strength of at least 3.0 pli at room temperature, at least 3.0 pli at 212° F., supports a static load of at least 0.67 pounds at 158° F., and exhibits a viscosity increase of less than 1500 centipoise after aging at 130° 1 F. for six weeks.

9. The composition of claim 8 wherein said thermoplastic rubber comprises a styrene-ethylene-butylene styrene block copolymer.

10. The composition of claim 9 wherein said endblock resin comprises cumarone indene.

11. The composition of claim 8 further including a reinforcing agent, an antioxidant, an antisettling agent and an accelerator agent for purposes of increasing the strength and stability of said composition.

12. The composition of claim 11 wherein said reinforcing agent comprises carbon black in an amount from about 0.01% to about 2% by weight, said antioxidant comprises a phenolic material in an amount from about 0.01% to about 2% by weight, said antisettling agent comprises fumed silica in an amount from about 0.2% to about 5% by weight, and said accelerator agent comprises stearic acid in an amount from about 0.01% to about 2% by weight.

13. The composition of claim 8 wherein said tackifier comprises an aliphatic hydrocarbon resin.

14. The composition of claim 8 wherein said solvent is selected from the group consisting of toluene, xylene, hexane, octane, and mixtures thereof.

15. The composition of claim 8 wherein said composition comprises
   a) from about 10% to about 14% by weight of said copolymer of isobutylene and p-methyl styrene;
   b) from about 5% to about 9% by weight of said thermoplastic rubber;
   c) from about 1% to about 3% by weight of said endblock resin for said thermoplastic rubber;
   d) from about 4% to about 8% by weight of said tackifier;
   e) from about 0.05% to about 2% by weight of said accelerator/cure package; and
   f) from about 65% to about 75% by weight of said solvent.

16. A solvent-based adhesive composition for adhering together roofing materials comprising:
   a) from about 10% to about 14% by weight of a halogenated copolymer of isobutylene and p-methyl styrene;
   b) from about 5% to about 9% by weight of a thermoplastic rubber;
   c) from about 1% to about 3% by weight of an endblock resin for said thermoplastic rubber;
   d) from about 4% to about 8% by weight of a tackifier;
   e) from about 0.05% to about 2% of an accelerator/cure package including a sulfur and/or zinc oxide curing agent;
   f) from about 65% to about 75% by weight of a solvent;
   g) from about 0.01% to about 2% by weight of a reinforcing agent;
   h) from about 0.01% to about 2% by weight of an antioxidant;
   i) from about 0.2% to about 5% by weight of an antisettling agent; and
   j) from about 0.01% to about 2% by weight of an accelerator agent, whereupon curing said composition exhibits a peel strength of at least 3.0 pli at room temperature, at least 3.0 pli at 212° F., supports a static load of at least 0.67 pounds at 158° F. and exhibits a viscosity increase of less than 1500 centipoise after aging at 130° F. for six weeks.

17. A method of making a solvent-based adhesive composition for adhering together roofing materials comprising the steps of:
  a) forming a homogeneous mixture of a halogenated copolymer of isobutylene and p-methyl styrene, a thermoplastic rubber, and an accelerator/cure package including a sulfur and/or zinc oxide curing agent;
  b) pelletizing said mixture;
  c) adding an endblock resin for said thermoplastic rubber, a tackifier, and a solvent to said mixture so as to form a slurry; and
  d) mixing said slurry until said mixture, said resin and said tackifier are completely solvated in said solvent.

18. The method of claim 17 further including the step of loading said slurry with a reinforcing agent, an antioxidant, an antisettling agent and an accelerator agent for purposes of increasing the strength and stability of said composition.

19. The method of claim 17 wherein said mixing step comprises mixing said slurry in a mixer maintained at temperature below about 200° F. so as to minimize scorching said slurry.

20. The method of claim 17 wherein said forming step comprises the step of mixing a) from about 10% to about 14% by weight of said copolymer of isobutylene and p-methyl styrene; b) from about 5% to about 9% by weight of said thermoplastic rubber; and c) from about 0.05% to about 2% by weight of said accelerator/cure package; and wherein said adding step comprises the step of adding d) from about 1% to about 3% by weight of said endblock resin for said thermoplastic rubber; e) from about 4% to about 8% by weight of said tackifier; and f) from about 65% to about 75% by weight of said solvent.

21. The composition of claim 1 further including a retarding agent to promote storage stability of said composition, wherein said retarding agent forms a complex with the halogen of said halogenated copolymer.

22. The composition of claim 21 wherein said regarding agent is magnesium oxide.

23. The composition of claim 8 further including a retarding agent to promote storage stability of said composition, wherein said retarding agent forms a complex with the halogen of said halogenated copolymer.

24. The composition of claim 23 wherein said retarding agent is magnesium oxide.

* * * * *